United States Patent [19]

Schreiner et al.

[11] Patent Number: 4,527,672
[45] Date of Patent: Jul. 9, 1985

[54] HEAT SHIELD FOR A BRAKE

[75] Inventors: Peter Schreiner; John R. Wegh, both of South Bend, Ind.; Roger L. Smith, Niles, Mich.

[73] Assignee: Allied Corporation, Morristown, N.J.

[21] Appl. No.: 432,591

[22] Filed: Oct. 4, 1982

[51] Int. Cl.³ .............................................. F16D 65/78
[52] U.S. Cl. .................................. 188/264 G; 92/168; 277/212 FB
[58] Field of Search ............. 188/264 G; 277/212 FB; 92/168, 248; 74/18.2

[56] References Cited

U.S. PATENT DOCUMENTS

| B 501,975 | 3/1976 | Kondo | 92/168 X |
|---|---|---|---|
| 3,432,010 | 3/1969 | Hemus | 92/168 X |
| 3,592,303 | 7/1971 | Tincher | 74/18.2 X |
| 3,661,231 | 5/1972 | Beller et al. | 92/168 X |
| 4,085,828 | 4/1978 | Thioux | 188/71.6 |
| 4,199,159 | 4/1980 | Evans | 277/212 FB |
| 4,401,012 | 8/1983 | Emmett | 92/248 |
| 4,431,090 | 2/1984 | Kinoshita | 92/168 X |

FOREIGN PATENT DOCUMENTS

| 1182087 | 11/1964 | Fed. Rep. of Germany | 188/725 |
|---|---|---|---|
| 7837265 | 12/1978 | Fed. Rep. of Germany | |
| 2021219 | 5/1979 | United Kingdom | |
| 2083576 | 9/1980 | United Kingdom | |
| 2111146 | 6/1983 | United Kingdom | 188/264 G |

Primary Examiner—George E. A. Halvosa
Attorney, Agent, or Firm—Larry J. Palguta; Ken C. Decker

[57] ABSTRACT

A heat shield (50) is positioned on a piston (14) in spaced relation to a friction element (16) to prevent heat transfer directly by conduction. The heat shield (50) opposes a boot seal (24) to keep the latter also spaced from the friction element (16).

1 Claim, 1 Drawing Figure

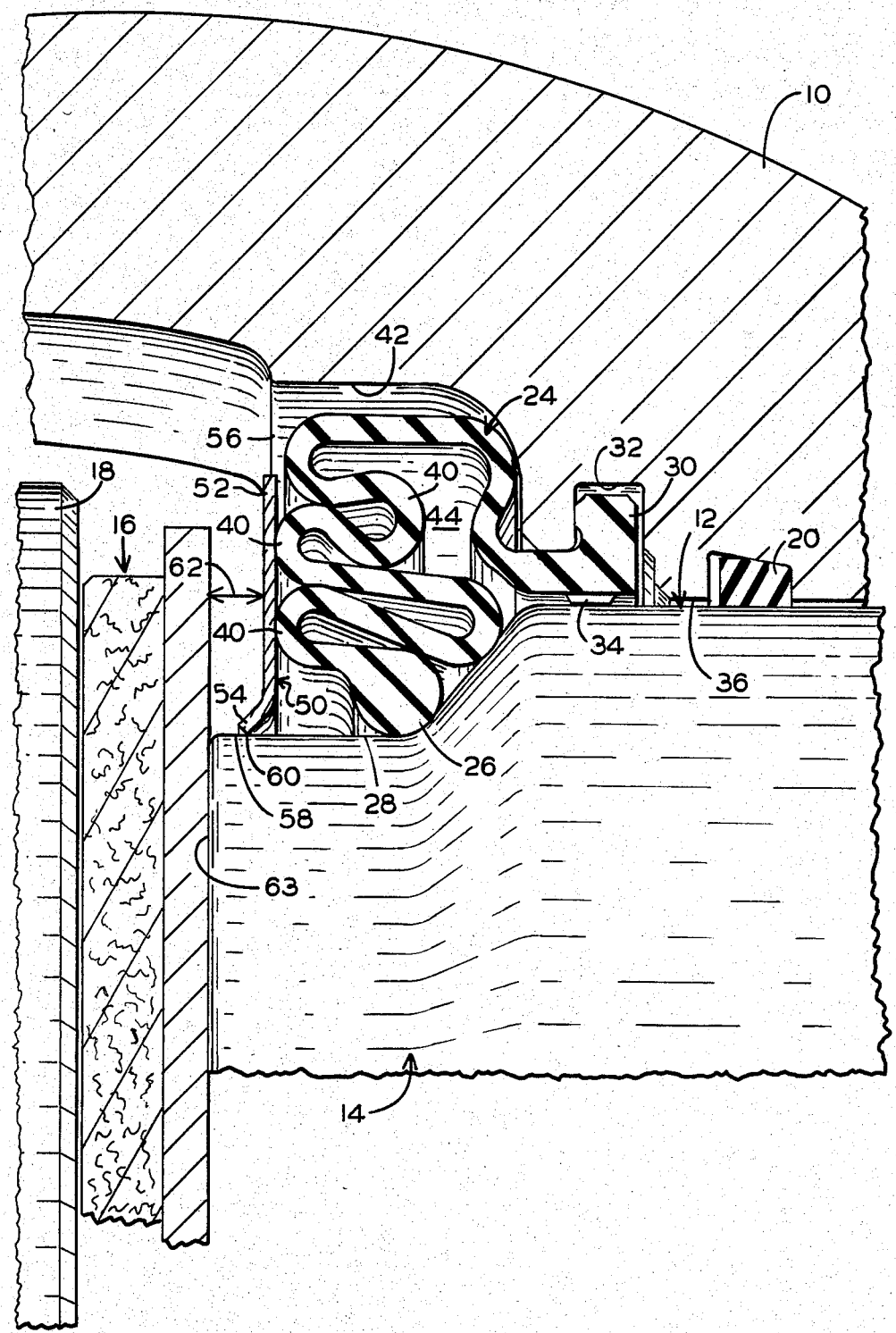

HEAT SHIELD FOR A BRAKE

This invention relates to a heat shield for a brake.

A heat shield for a brake assembly wherein a piston is movably carried within a housing bore such that movement of the piston during braking in one direction imparts movement to a friction element which is engageable with a rotating member to convert kinetic energy for the rotating member into thermal energy for the friction element, thereby increasing the temperature of the friction element, the shield cooperating with the piston to substantially reduce the thermal energy transferred from the friction element to a boot seal engaging the piston and the piston cooperating with the housing and the friction element to define a cavity for receiving the boot seal and the heat shield.

In U.S. Pat. No. 4,085,828 a heat shield is disclosed which extends over the length of the inner friction element and is directly engaging the inner friction element. In order to restrict heat transfer to the piston and boot seal a layer of insulation is provided between the friction element and the piston and the heat shield is mounted between the piston and friction element.

In other prior art devices a heat shield is attached to a piston to separate the friction element from the piston; however, the heat shield directly engages the friction element to provide a heat sink for receiving thermal energy so that when the boot seal contacts the heat shield thermal energy is transferred to the boot seal. The thermal energy transferred to the boot seal to increase the temperature thereof is believed to adversely affect the resiliency characteristics of the boot seal which is made from a rubber-like material. In addition the heat shield for these other prior art devices is attached to the piston such that a large surface area for the heat shield is contacting the piston in a press fit relation so that thermal energy transferred to the piston is readily transferred to the large surface area to further increase the temperature of the heat shield.

The present invention is characterized by said heat shield including a first portion extending radially and opposing said boot seal, said heat shield including a second portion extending angularly relative to said first portion and fixedly engaging said piston, said second portion cooperating with said piston to maintain said first portion spaced from said friction element and said first portion preventing said boot seal from contacting said friction element whereby the thermal energy for said friction element is dissipated to the spacing between said first portion and said friction element.

The present invention will now be explained with reference to the accompanying drawing wherein a cut away cross-sectional view is shown for a portion of a disc brake.

The disc brake defines a caliper 10 with an axially extending bore 12 receiving a piston 14. A friction element 16 adjacent the piston opposes one side of a rotor 18. Although not shown, it is well known in the art that a second friction element faces the other side of the rotor 18 and the caliper 10 extends over the rotor 18 to abut the second friction element. The piston is sealingly slideable with the wall of the housing bore 12 via a retraction seal 20 so that when fluid pressure is communicated to the caliper, the piston 14 moves toward the rotor to fully engage the friction element 16 with the rotor. Kinetic energy for the rotating rotor is converted to thermal energy for the friction element to increase the temperature thereof.

In order to protect the retraction seal 20 from contamination and to keep particles away from the sliding interface between the piston and the housing bore 12, a boot seal 24 extends between the piston and the housing bore 12. The boot seal includes a first end forming a bead 26 directly engaging a reduced diameter section 28 for the piston 14 and a second end forming a bead 30. The bead 30 is disposed within a recess 32 defined in the housing bore 12 and a plurality of ribs 34 extend from the bead to engage the piston at an enlarged diameter section 36. The boot seal also includes a plurality of convolutions 40 permitting axial extension of the piston to separate the beads from each other while maintaining the beads in engagement with the piston and housing. The reduced diameter section 28 cooperates with an enlarged diameter portion 42 for the bore 12 to define a cavity 44 for receiving the boot seal 24.

In accordance with the invention a heat shield 50 is attached to the reduced diameter portion 28 of the piston 14 in a manner hereinafter described. The heat shield 50 includes a first portion 52 extending radially outwardly from the piston to form a partial boundary for the cavity 44, and a second portion 54 extending angularly relative to the first portion toward the rotor 18. The second portion 54 is shorter than the first portion 52; however, the second portion 54 tightly engages the piston 14 and the first portion 52 is spaced from the caliper 10 to define a gap 56 opening the cavity 44 and the boot seal 24 to the environment surrounding the disc brake. The second portion extends upwardly to a position radially outwardly of the rotor 18. The second portion 54 defines an angle with the first portion 52 equal to about 45° so that during attachment of the heat shield to the piston, the second portion is deflected radially outwardly and axially toward the rotor to generate a gripping force biasing the second portion edge 58 tightly into engagement with the piston so that a press fit exists between the heat shield and piston. The heat shield edge 58 forms an opening so that the heat shield is pressed over the piston reduced diameter section 28 to remain spaced from the front end 63 of the piston. With the angle provided between the heat shield portions, the heat shield 50 remains spaced also from the friction element 16 over its entire radial dimension via spacing 62. The heat shield 50 also opposes the boot seal 24 to retain the latter spaced from the friction element 16. Furthermore, as can be seen in the FIGURE, the heat shield aids in retaining the boat seal in engagement with the piston and the second portion 54 provides a single line of engagement with the outer surface of the piston to provide the sole means for carrying the heat shield wholly on and about the piston's exterior surface.

During braking, the piston 14 is moved toward the rotor 18 to fully engage the friction element 16 with the rotor. Consequently, the kinetic energy of the rotating rotor is transformed to thermal energy for the friction element resulting in an increase in temperature for the friction element. With the heat shield spaced from the friction element, the spacing 62 provides an insulation barrier retarding heat transfer to the heat shield and retarding heat transfer to the boot seal. Also, with the disc brake moving with an associated vehicle, the spacing 62 permits air flow around the back of the friction elements to assist with heat dissipation to the environment. There is some heat transfer directly to the piston 14 so that the bead 26 will experience some increase in temperature due to heat conduction via the friction element and piston. For this reason, the gap 56 is provided to permit dissipation of heat to the environment from the bead 26 and the remaining part of the boot seal. In order to minimize heat transfer to the heat shield via conduction by way of the piston, the edge 58 is the only part of the heat shield engaging the piston.

In conclusion, it is seen that a simple heat shield is adapted to fit within a small cavity to protect the boot seal from heat developed by the thermal energy absorbed by the friction element. The heat shield is disposed on the piston independently of the friction element so that the friction element need not accommodate any contact therewith.

We claim:

1. A heat shield for a disc brake assembly wherein a piston is movably carried within a caliper housing bore such that movement of the piston during braking in one direction imparts movement to a friction element which is engageable with a rotating member to convert kinetic energy for the rotating member into thermal energy for the friction element, thereby increasing the temperature of the friction element, the heat shield cooperating with the piston to substantially reduce the thermal energy transferred from the friction element to a boot seal engaging the piston, and the piston cooperating with the housing and the friction element to define a cavity for receiving the boot seal and the heat shield, characterized by said heat shield including a first portion extending radially and opposing said boot seal to retain the boot seal in engagement with said piston, said heat shield including a second portion extending angularly relative to said first portion and fixedly engaging said piston, said second portion cooperating with said piston to maintain said first portion spaced from said friction element and said first portion preventing said boot seal from contacting said friction element whereby the thermal energy for said friction element is dissipated to the spacing between said first portion and said friction element, said second portion defining a gripping edge providing a single line of engagement and engaging an outer surface of said piston to provide the sole means for carrying said heat shield on said piston at a location spaced from said caliper housing and said friction element, said second portion extending angularly from said gripping edge in a direction away from said friction element to define the spacing between said first portion and said friction element so that said heat shield first and second portions are spaced from said friction element and disposed wholly about the exterior of said piston.

* * * * *